(12) United States Patent
Ogasawara et al.

(10) Patent No.: US 10,767,899 B2
(45) Date of Patent: Sep. 8, 2020

(54) FLUID-HEATING DEVICE

(71) Applicant: CALSONIC KANSEI CORPORATION, Saitama-shi, Saitama (JP)

(72) Inventors: Takeshi Ogasawara, Saitama (JP); Naohisa Kamiyama, Saitama (JP); Hiroki Yoshioka, Saitama (JP); Takashi Ootsuka, Saitama (JP); Daiju Suzuki, Saitama (JP)

(73) Assignee: CALSONIC KANSEI CORPORATION, Saitama-Shi (JP)

( * ) Notice: Subject to any disclaimer, the term of this patent is extended or adjusted under 35 U.S.C. 154(b) by 316 days.

(21) Appl. No.: 15/740,528

(22) PCT Filed: Jun. 8, 2016

(86) PCT No.: PCT/JP2016/067107
§ 371 (c)(1),
(2) Date: Dec. 28, 2017

(87) PCT Pub. No.: WO2017/002563
PCT Pub. Date: Jan. 5, 2017

(65) Prior Publication Data
US 2018/0187920 A1    Jul. 5, 2018

(30) Foreign Application Priority Data

Jun. 30, 2015 (JP) .................................. 2015-130748
Feb. 5, 2016 (JP) .................................. 2016-021030

(51) Int. Cl.
*F24H 1/10* (2006.01)
*H05B 3/50* (2006.01)
*F24H 9/18* (2006.01)
*F24H 1/14* (2006.01)
(Continued)

(52) U.S. Cl.
CPC ............ *F24H 1/105* (2013.01); *B60H 1/2221* (2013.01); *F24H 1/009* (2013.01); *F24H 1/142* (2013.01);
(Continued)

(58) Field of Classification Search
CPC ... B60H 1/00385; B60H 1/2221; F24H 1/009; F24H 1/105; F24H 1/142; F24H 9/0021; F24H 9/1818; H05B 3/50; H05B 3/78
(Continued)

(56) References Cited

U.S. PATENT DOCUMENTS

| 1,614,974 A | 1/1927 | Strauss |
| 3,942,587 A | 3/1976 | Favier |

(Continued)

FOREIGN PATENT DOCUMENTS

| CN | 103743088 A | 4/2014 |
| DE | 22 57 994 A1 | 5/1974 |

(Continued)

*Primary Examiner* — Dana Ross
*Assistant Examiner* — Joseph W Iskra
(74) *Attorney, Agent, or Firm* — Foley & Lardner LLP

(57) ABSTRACT

A fluid-heating device for heating fluid includes a heater unit configured to have a heater and a heating portion, the heating portion being formed as to cover surrounding of the heater, wherein the heating portion has an inner heat exchange surface formed on an inner surface of a through hole penetrating through an inner side of the heater and an outer heat exchange surface formed on an outer-wall portion of an outer side of the heater, the inner heat exchange surface being configured to perform heat exchange with the fluid, and the outer heat exchange surface being configured to perform the heat exchange with the fluid.

18 Claims, 5 Drawing Sheets

(51) Int. Cl.
*B60H 1/22* (2006.01)
*F24H 1/00* (2006.01)
*H05B 3/78* (2006.01)
*B60H 1/00* (2006.01)
*F24H 9/00* (2006.01)

(52) U.S. Cl.
CPC ............. *F24H 9/1818* (2013.01); *H05B 3/50* (2013.01); *H05B 3/78* (2013.01); *B60H 1/00385* (2013.01); *F24H 9/0021* (2013.01)

(58) Field of Classification Search
USPC ........................................................ 392/478
See application file for complete search history.

(56) References Cited

U.S. PATENT DOCUMENTS

| | | | |
|---|---|---|---|
| 5,271,086 | A | 12/1993 | Kamiyama et al. |
| 8,948,582 | B2 * | 2/2015 | Kominami ................ F24H 9/20 165/175 |

| | | | |
|---|---|---|---|
| 2013/0186883 | A1 | 7/2013 | Watanabe et al. |
| 2015/0043899 | A1 | 2/2015 | Pierron et al. |
| 2015/0221466 | A1 | 8/2015 | Suzuki et al. |

FOREIGN PATENT DOCUMENTS

| | | |
|---|---|---|
| DE | 24 02 942 A1 | 7/1974 |
| JP | S48-103908 U | 12/1973 |
| JP | S49-66058 U | 6/1974 |
| JP | S58-140550 A | 8/1983 |
| JP | 2000-234690 A | 8/2000 |
| JP | 2012-124222 A | 6/2012 |
| JP | 2014-053288 A | 3/2014 |
| JP | 2014-228252 A | 12/2014 |
| JP | 2014228252 * | 12/2014 |
| JP | 2015-516908 A | 6/2015 |
| WO | WO-2014/142277 A1 | 9/2014 |

* cited by examiner

FLUID-HEATING DEVICE

TECHNICAL FIELD

The present invention relates to a fluid-heating device for heating a fluid.

BACKGROUND ART

JP2014-053288A discloses a fluid-heating device in which a fluid supplied into a tank from a supply passage is heated by a heater and is discharged from a discharge passage. With this fluid-heating device, the fluid flowing through the tank is heated by a helical-shaped heater provided in the tank.

SUMMARY OF INVENTION

However, with the fluid-heating device disclosed in JP2014-053288A, a heat generating part of the heater is accommodated in the tank through which the fluid flows, and the fluid is brought into direct contact with a surface of the heat generating part to perform heat exchange. Therefore, a heat transfer area for performing the heat exchange with the fluid depends on the size of the heater.

An object of the present invention is to increase a heat transfer area for performing a heat exchange with fluid.

According to one aspect of the present invention, a fluid-heating device for heating fluid comprising a heater unit configured to have a heater and a heating portion, the heating portion being formed so as to cover surrounding of the heater, wherein the heating portion has an inner heat exchange surface formed on an inner surface of a through hole penetrating through an inner side of the heater, the inner heat exchange surface being configured to perform heat exchange with the fluid and an outer heat exchange surface formed on an outer-wall portion of an outer side of the heater, the outer heat exchange surface being configured to perform the heat exchange with the fluid.

According to this aspect, the heater unit has the heating portion that is formed so as to cover the surrounding of the heater. The heating portion has the inner heat exchange surface that is formed on the inner surface of the through hole that penetrates through the inner side of the heater and the outer heat exchange surface that is formed on the outer-wall portion of the outer side of the heater. In the heater unit, because the surface area of the heating portion corresponds to the heat transfer area for performing the heat exchange with the fluid, the total surface area of the inner heat exchange surface and the outer heat exchange surface becomes equal to the heat transfer area. Therefore, as compared to a case in which the heater is brought into direct contact with the fluid, it is possible to increase the heat transfer area for performing the heat exchange with the fluid.

DESCRIPTION OF EMBODIMENTS

A fluid-heating device 100 according to an embodiment of the present invention will be described below with reference to the drawings.

The fluid-heating device 100 is applied to a vehicle air-conditioning device (not shown) mounted on a vehicle such as an EV (Electric Vehicles), an HEV (Hybrid Electric Vehicles), and so forth. The fluid-heating device 100 heats hot water serving as fluid when the vehicle air-conditioning device performs a cabin-heating operation.

An overall configuration of the fluid-heating device 100 will be described first with reference to FIGS. 1 to 4.

Figure 1:
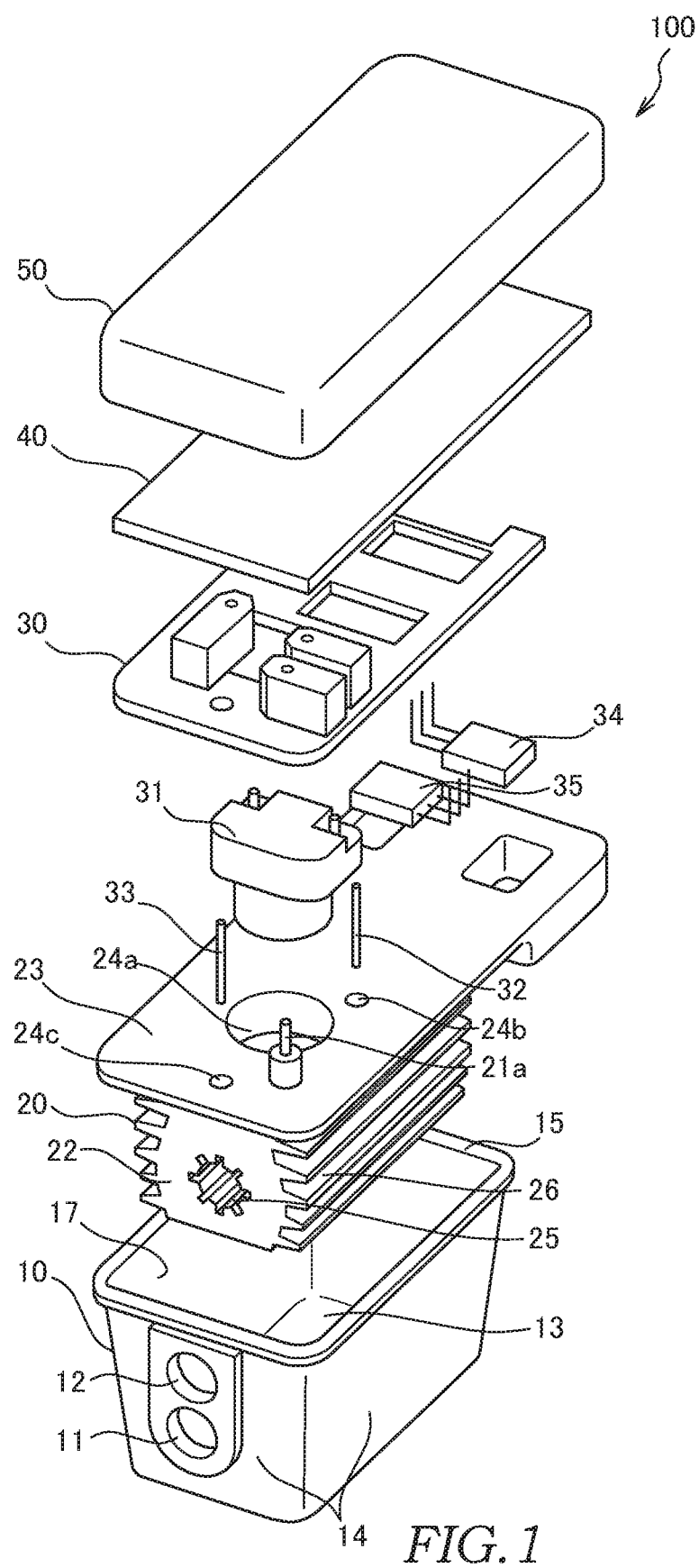
FIG. 1 is an exploded perspective view of a fluid-heating device according to an embodiment of the present invention.

As shown in FIG. 1, the fluid-heating device 100 includes a tank 10 through which water flows, a heater unit 20 that is accommodated in the tank 10, a bus-bar module 30 for connecting various electric components, a control substrate 40 that serves as a control unit for controlling operation of the heater unit 20, and a cover 50 that covers the bus-bar module 30 and the control substrate 40.

The tank 10 is formed to have a substantially cuboid shape. The tank 10 has a rectangular bottom surface 13, wall surfaces 14 erected from the bottom surface 13, and an opening portion 15 that opens at end portions of the wall surfaces 14 so as to oppose the bottom surface 13. The tank 10 also has a supply port 11 through which the hot water is supplied and a discharge port 12 through which the hot water is discharged. The supply port 11 and the discharge port 12 have openings that are aligned vertically on the same wall surface 14 of the tank 10. The fluid-heating device 100 is disposed in the vehicle such that the discharge port 12 is positioned above the supply port 11 when used.

Figure 2:
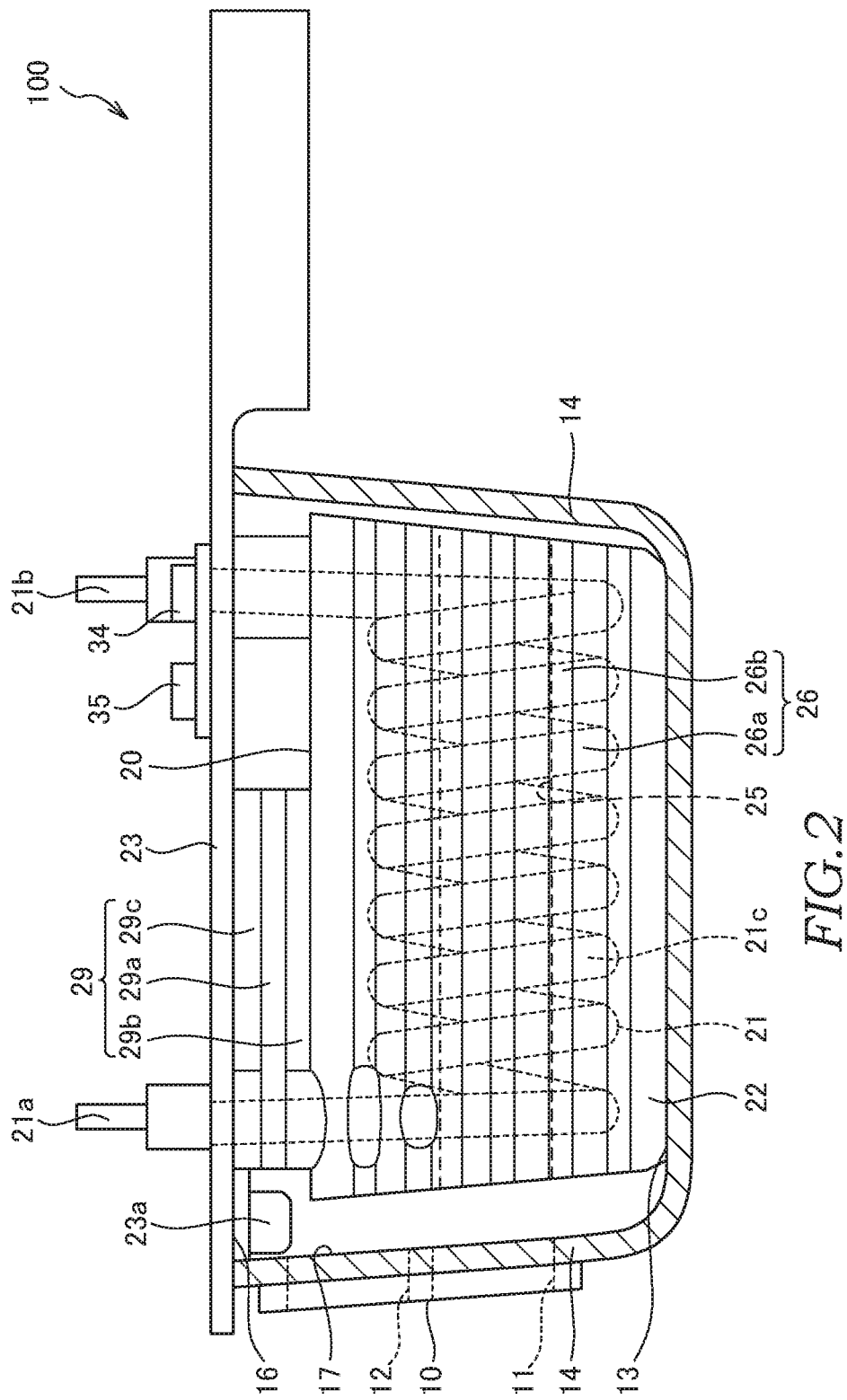
FIG. 2 is a side view of a heater unit and a tank of the fluid-heating device and is a diagram in which the tank is viewed in cross section.
Figure 3:
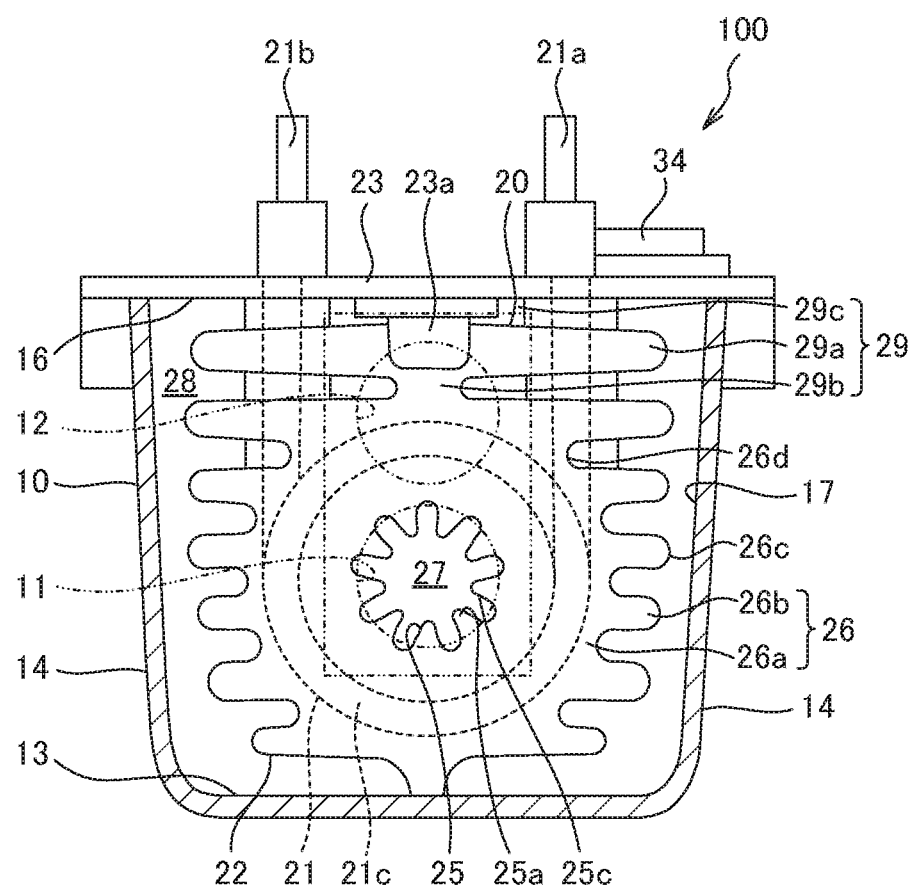
FIG. 3 is a front view of the heater unit and the tank of the fluid-heating device and is a diagram in which the tank is viewed in cross section.

As shown in FIGS. 2 and 3, the heater unit 20 has a heater 21, a heating portion 22 that is formed so as to cover the surrounding of the heater 21, a connecting portion 29 that connects a top surface 16 and the heating portion 22, and heat releasing fins 29a serving as a pair of heat releasing portions that are formed so as to project out from the connecting portion 29. In the heater unit 20, the heating portion 22 is formed by die-cast molding a metal around the heater 21. The heater unit 20 is connected to the top surface 16 of a top-plate portion 23 via the connecting portion 29 and is integrally molded with the top-plate portion 23. The top-plate portion 23 is provided so as to close the opening portion 15 into which the heater unit 20 is inserted.

The heater 21 has a pair of terminals 21a and 21b to which electrical power is supplied through the bus-bar module 30 from a power unit (not shown) mounted on the vehicle. The heater 21 has a helical-shaped heat generating part 21c provided between the pair of terminals 21a and 21b so as to project out into the tank 10. The heater 21 may not have the helical-shaped, and for example, the heater 21 may have a heat generating part that is formed so as to extend back and forth in the heating portion 22.

The heater 21 is a sheathed heater or a PTC (Positive Temperature Coefficient) heater that generates heat at the heat generating part 21c by applying current. It is preferable to employ the sheathed heater as the heater 21 in terms of costs. Upon receiving an instruction from the control substrate 40, the heater 21 generates heat and heats the hot water flowing through the tank 10.

The heating portion 22 has a through hole 25 and an outer-wall portion 26. The through hole 25 is formed so as to have a diameter smaller than an inner circumference of the heat generating part 21c and that penetrates through an inner side of the heat generating part 21c along the center axis thereof, and the outer-wall portion 26 is formed on an outer side of the heat generating part 21c so as to have a diameter larger than an outer circumference of the heat generating part 21c and to face an inner wall 17 of the tank 10. An inner surface of the through hole 25 is formed with an inner heat exchange surface 25c that performs heat exchange with the fluid, and the outer-wall portion 26 is formed with an outer heat exchange surface 26c that performs the heat exchange with the fluid. The heating portion 22 is molded of a metal having a lower melting point as compared to the heater 21. In this embodiment, the heater 21 is formed of stainless steel, and the heating portion 22 is formed of aluminum alloy.

The through hole 25 is formed in the heat generating part 21c coiled into the helical-shape. The supply port 11 of the tank 10 opens on the line extending from the through hole 25. The through hole 25 forms an inner circumferential flow channel 27 (see FIG. 3) through which the hot water supplied from the supply port 11 flows. The configuration is not limited thereto, and the discharge port 12 of the tank 10 may open on the line extending from the through hole 25.

As shown in FIG. 3, the through hole 25 has a plurality of inner circumferential fins 25a that project towards the inner circumference along the flowing direction of the hot water. With the inner circumferential fins 25a, the heat transfer area of the inner-circumferential flow channel 27 is increased as compared to a case in which the inner circumferential fins 25a are not provided. The plurality of inner circumferential fins 25a are formed over the entire circumference of the through hole 25 at equal angle intervals so as to extend towards the inner circumference in a radiating pattern.

The outer-wall portion 26 forms an outer circumferential flow channel 28 between the outer-wall portion 26 and the inner wall 17 of the tank 10. The outer circumferential flow channel 28 is continuous with the inner circumferential flow channel 27 so as to allow flow of the hot water therethrough. The outer circumferential flow channel 28 guides the hot water that has flowed from the inner circumferential flow channel 27 to the discharge port 12. The heat transfer area of the outer-wall portion 26 is larger than that of the through hole 25. In addition, the flow channel area of the outer circumferential flow channel 28 is larger than that of the inner-circumferential flow channel 27.

The outer-wall portion 26 has an outer-wall main body 26a formed so as to match with the outer-circumference shape of the heater 21 and a plurality of outer circumferential fins 26b that project towards the outer circumference from the outer-wall main body 26a along the flowing direction of the hot water.

The outer-wall main body 26a is formed so as to cover the outer side of the heat generating part 21c coiled into the helical-shape. Because the outer-wall main body 26a is provided, the heater 21 does not come into direct contact with the hot water.

With the outer circumferential fins 26b, the heat transfer area of the outer circumferential flow channel 28 is increased as compared to a case in which the outer circumferential fins 26b are not provided. The outer circumferential fins 26b are provided so as to extend substantially parallel to the bottom surface 13 and the top surface 16 of the tank 10. The outer circumferential fins 26b are formed such that the distance from a proximal portion 26d is increased towards the top surface 16 as compared to that at the central portion of the tank 10 in the height direction. In addition, the outer circumferential fins 26b are formed such that the distance from the proximal portion 26d is increased with increasing distance from the top surface 16 as compared to that at the central portion of the tank 10 in the height direction. The outer circumferential fins 26b are respectively formed so as to face a pair of opposed wall surfaces 14 of the tank 10 at predetermined gaps.

The outer-wall portion 26 of the proximal portion 26d located between a pair of outer circumferential fins 26b adjacent to each other is formed so as to be closer to the heat generating part 21c of the heater 21 relative to the outer-wall portions 26 of other portions. With such a configuration, the distance between the heat generating part 21c of the heater 21 and the hot water flowing through the outer circumferential flow channel 28 can be reduced, and thereby, it is possible to improve the heat exchange efficiency between the heating portion 22 and the hot water. In addition, all of the proximal portions 26d of the heating portion 22 are formed such that the distances from the heater 21 become substantially the same.

The number of the outer circumferential fins 26b is greater than that of the inner circumferential fins 25a. With such a configuration, the heat transfer area of the outer heat exchange surface 26c is greater than the heat transfer area of the inner heat exchange surface 25c. In addition, the length of the outer circumferential fins 26b is greater than the length of the inner circumferential fins 25a. With such a configuration, it is possible to ensure a performance to heat the hot water without deteriorating moldability for die-cast molding the heating portion 22.

As described above, the heater unit 20 has the heating portion 22 that is formed so as to cover the surrounding of the heater 21. The heating portion 22 has the inner heat exchange surface 25c that is formed on the inner surface of the through hole 25 penetrating through the inner side of the heat generating part 21c and the outer heat exchange surface 26c that is formed on the outer-wall portion 26 of the outer circumference of the heat generating part 21c. In the heater unit 20, because the surface area of the heating portion 22 corresponds to the heat transfer area for performing the heat exchange with the hot water, the total surface area of the inner heat exchange surface 25c and the outer heat exchange surface 26c becomes equal to the heat transfer area. Therefore, as compared to a case in which the heater 21 is brought into direct contact with the hot water, it is possible to increase the heat transfer area for performing the heat exchange with the hot water.

Figure 4:
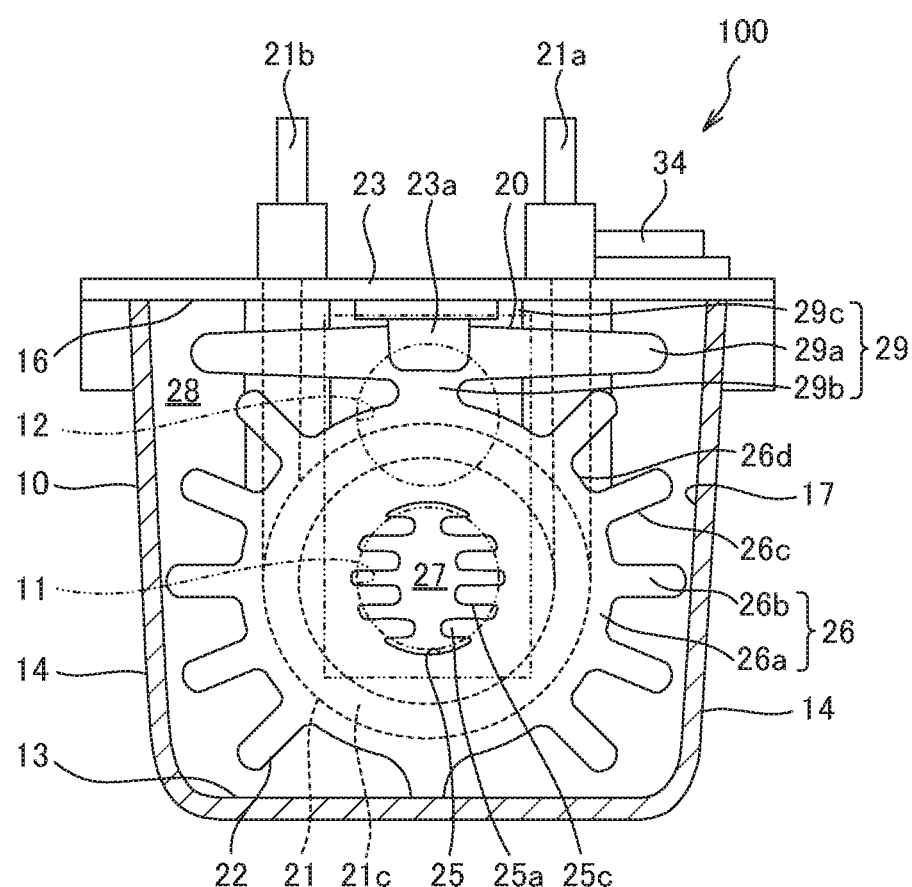
FIG. 4 is a front view of the heater unit and the tank of the fluid-heating device according to a modification of the embodiment of the present invention and is a diagram in which the tank is viewed in cross section.

As a modification shown in FIG. 4, the outer circumferential fins 26b may be formed towards outer circumference in a radiating pattern, and the inner circumferential fins 25a may be provided so as to extend in substantially parallel to the top surface 16 of the tank 10. Similarly, in this case, it is also possible to increase the heat transfer area for performing the heat exchange with the hot water. It suffices that the plurality of inner circumferential fins 25a be respectively formed so as to be substantially parallel to each other, and the inner circumferential fins 25a may not be substantially parallel to the top surface 16 of the tank 10. In addition, both of the inner circumferential fins 25a and the outer circumferential fins 26b may be formed in a radiating pattern, and both of the inner circumferential fins 25a and the outer circumferential fins 26b may be provided so as to extend in substantially parallel to the top surface 16 of the tank 10.

As shown in FIGS. 3 and 4, the connecting portion 29 is formed such that a sectional area of a first connecting portion 29b connected to the heating portion 22 is smaller than a sectional area of a second connecting portion 29c connected to the top surface 16. With such a configuration, conduction of the heat of the heater 21 via the top surface 16 to electronic parts such as IGBTs 34 and 35, which will be described later, is suppressed.

Similarly to the outer circumferential fins 26b, the heat releasing fins 29a are provided so as to extend in substantially parallel to the bottom surface 13 and the top surface 16 of the tank 10. By providing the heat releasing fins 29a, the heat that has conducted from the heating portion 22 via the first connecting portion 29b is released to the hot water in the outer circumferential flow channel 28, and thereby, conduction of the heat of the heater 21 via the top surface 16 to the electronic parts such as the IGBTs 34 and 35, which will be described later, is further suppressed.

As shown in FIG. 2, the top-plate portion 23 is formed so as to be longer than the opening portion 15 of the tank 10 in the axial direction of the heater unit 20. A part of the top-plate portion 23 extending out from the tank 10 is provided with connectors (not shown) for connecting the fluid-heating device 100 to the power unit, a host controller, and so forth (not shown) mounted on the vehicle.

The top-plate portion 23 is welded to an outer circumference edge of the opening portion 15 in a state in which the heater unit 20 is inserted into the tank 10. The top-plate portion 23 forms the top surface 16 of the tank 10. The top surface 16 opposes the bottom surface 13 of the tank 10 so as to be substantially in parallel therewith.

As shown in FIG. 1, the top-plate portion 23 is formed with a recessed portion 24a for attaching a bimetal switch 31 serving as a temperature switch, a recessed portion 24b for attaching a heater temperature sensor 32, and a recessed portion 24c for attaching a water temperature sensor 33.

The bimetal switch 31 detects the temperature of the heater unit 20 and is switched in accordance with the detected temperature. Specifically, when the temperature of the heater unit 20 becomes higher than a first set temperature, the bimetal switch 31 interrupts the supply of the electrical power to the heater unit 20. When the temperature of the heater unit 20 becomes lower than a second set temperature that is lower than the first set temperature, the bimetal switch 31 may be switched again such that the supply of the electrical power to the heater unit 20 is restarted.

The heater temperature sensor 32 detects a temperature of the heater 21 of the heater unit 20. The heater temperature sensor 32 sends an electric signal to the control substrate 40 in accordance with the detected temperature of the heater 21. When the temperature of the heater 21 detected by the heater temperature sensor 32 is higher than the set temperature, the control substrate 40 stops supply of the electrical power to the heater 21.

The water temperature sensor 33 detects the temperature of the hot water in the vicinity of the discharge port 12 of the tank 10. In other words, the water temperature sensor 33 detects the temperature of the hot water to be discharged from the tank 10 after the hot water has been heated. The water temperature sensor 33 is provided in a projected portion 23a (see FIGS. 2, 3, and 4) that projects into the tank 10 from the top-plate portion 23. The water temperature sensor 33 sends an electric signal to the control substrate 40 in accordance with the detected temperature of the hot water. The control substrate 40 controls the supply of the electrical power to the heater 21 such that the temperature of the hot water detected by the water temperature sensor 33 becomes a desired temperature.

As shown in FIG. 2, a pair of IGBTs (Insulated Gate Bipolar Transistors) 34 and 35 serving as switching elements are brought into contact with the top-plate portion 23.

The IGBTs 34 and 35 are connected to the power unit of the vehicle via the bus-bar module 30. The IGBTs 34 and 35 are connected to the control substrate 40, and performs switching operation in accordance with an instruction signal from the control substrate 40. The IGBTs 34 and 35 control supply of the electrical power to the heater unit 20 by the switching operation. With such a configuration, a temperature of the heater unit 20 is adjusted to a desired temperature, and thereby, a temperature of the hot water discharged from the discharge port 12 is adjusted to a desired temperature.

The IGBTs 34 and 35 generate the heat by repeating the switching operation. The highest temperature at which the IGBTs 34 and 35 can operate is higher than the temperature of the hot water flowing in the tank 10. Thus, the IGBTs 34 and 35 are cooled as the heat is transferred via the top-plate portion 23 to the hot water flowing in the tank 10.

As shown in FIG. 1, the bus-bar module 30 is layered on top of the top-plate portion 23. The bus-bar module 30 is formed to have a rectangular shape smaller than the top-plate portion 23. The bus-bar module 30 is a conductive connecting member formed of metal plates capable of sending and supplying the electrical power and the electric signals.

The control substrate 40 is layered on top of the bus-bar module 30. The control substrate 40 is formed to have a rectangular shape smaller than the top-plate portion 23. The control substrate 40 is electrically connected to the bus-bar module 30 and the IGBTs 34 and 35. The control substrate 40 controls the IGBTs 34 and 35 on the basis of the instruction from the host controller.

The cover 50 is provided above the control substrate 40. The cover 50 is formed to have substantially the same outer-circumference shape as that of the top-plate portion 23. The cover 50 is welded to an outer circumference edge of the top-plate portion 23. The cover 50 seals an internal space formed between the cover 50 and the top-plate portion 23.

Next, action of the fluid-heating device 100 will be described with main reference to FIG. 5.

Figure 5:
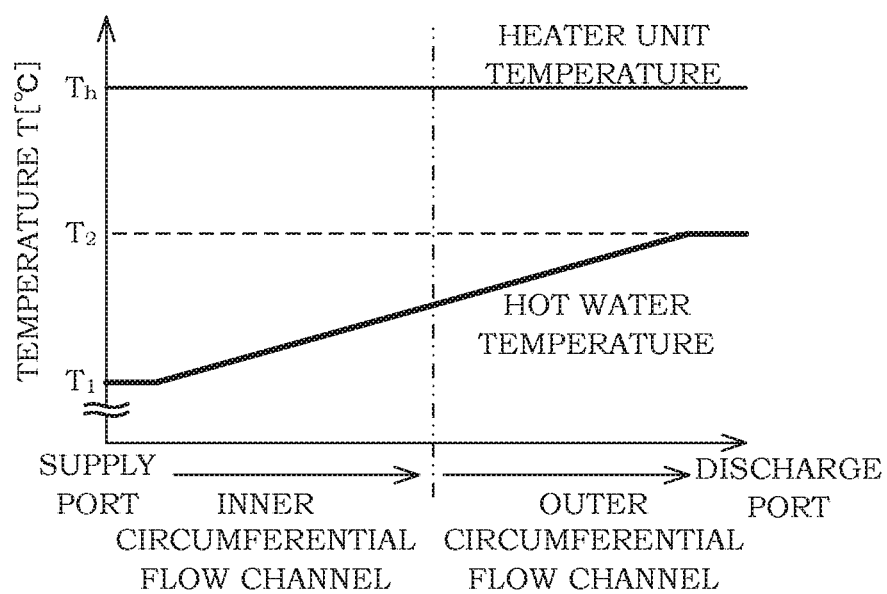
FIG. 5 is a diagram for explaining a temperature change of fluid heated by the fluid-heating device.

In FIG. 5, the horizontal axis shows the distance at which the hot water flows in the tank 10 between the supply port 11 and the discharge port 12, and the vertical axis shows the temperature T [° C.]. As shown in FIG. 5, in the fluid-heating device 100, the hot water at the temperature $T_1$ [° C.] supplied from the supply port 11 is heated to the temperature $T_2$ [° C.] with the heater unit 20 at the temperature $T_h$ [° C.] and is discharged from the discharge port 12.

The supply port 11 is formed on the line extending from the through hole 25. Therefore, the hot water at the temperature $T_1$ is supplied from the supply port 11 and is guided to the inner circumferential flow channel 27. In the inner circumferential flow channel 27, the hot water is heated by the heat exchange with the inner circumference of the through hole 25 where the inner circumferential fins 25a are formed. At this time, the flow of the hot water is rectified by the inner circumferential fins 25a that are formed along the flowing direction of the hot water.

The hot water that has passed the inner circumferential flow channel 27 changes the flowing direction by hitting the wall surfaces 14 opposing the supply port 11 of the tank 10 and is guided to the outer circumferential flow channel 28. As described above, the hot water flows through the inner circumferential flow channel 27 and the outer circumferential flow channel 28 continuously. The hot water flowing through the outer circumferential flow channel 28 is further heated by the heat exchange with the outer-wall main body 26a and the outer circumferential fins 26b. At this time, the flow of the hot water is also rectified by the outer circumferential fins 26b that are formed along the flowing direction of the hot water. The hot water that has been heated to the temperature $T_2$ is then discharged from the discharge port 12.

Here, the flow channel area of the outer circumferential flow channel 28 is larger than the flow channel area of the inner circumferential flow channel 27. Therefore, the flow speed $V_2$ [m/s] of the hot water in the outer circumferential flow channel 28 is slower than the flow speed $V_1$ [m/s] of the hot water in the inner circumferential flow channel 27. However, the heat transfer area of the outer-wall portion 26 facing the outer circumferential flow channel 28 is larger than the heat transfer area of the through hole 25 forming the inner circumferential flow channel 27. Thus, as shown in FIG. 5, it is possible to make the rate of temperature increase of the hot water in the inner circumferential flow channel 27 and the outer circumferential flow channel 28 substantially constant.

According to the embodiment mentioned above, the advantages described below are afforded.

The heater unit 20 has the heating portion 22 that is formed so as to cover the surrounding of the heater 21. The heating portion 22 has the inner heat exchange surface 25c that is formed on the inner surface of the through hole 25 penetrating through the inner side of the heat generating part 21c and the outer heat exchange surface 26c that is formed on the outer-wall portion 26 of the outer circumference of the heat generating part 21c. In the heater unit 20, because the surface area of the heating portion 22 corresponds to the heat transfer area for performing the heat exchange with the hot water, the total surface area of the inner heat exchange surface 25c and the outer heat exchange surface 26c becomes equal to the heat transfer area. Therefore, as compared to a case in which the heater 21 is brought into direct contact with the hot water, it is possible to increase the heat transfer area for performing the heat exchange with the hot water.

In addition, because the flow channel area of the outer circumferential flow channel 28 is larger than the flow channel area of the inner circumferential flow channel 27, the flow speed $V_2$ of the hot water in the outer circumferential flow channel 28 is slower than the flow speed $V_1$ of the hot water in the inner circumferential flow channel 27. However, the heat transfer area of the outer-wall portion 26 facing the outer circumferential flow channel 28 is larger than the heat transfer area of the through hole 25 forming the inner circumferential flow channel 27. Thus, it is possible to make the rate of temperature increase in the inner circumferential flow channel 27 and the outer circumferential flow channel 28 substantially constant.

Embodiments of this invention were described above, but the above embodiments are merely examples of applications of this invention, and the technical scope of this invention is not limited to the specific constitutions of the above embodiments.

For example, in the above-mentioned embodiment, the hot water supplied from the supply port 11 is discharged from the discharge port 12 by flowing the outer circumferential flow channel 28 after the inner circumferential flow channel 27. The configuration is not limited thereto, and the hot water supplied from the supply port 11 may be discharged from the discharge port 12 by flowing the inner circumferential flow channel 27 after the outer circumferential flow channel 28.

This application claims priority based on Japanese Patent Application No. 2015-130748 filed with the Japan Patent Office on Jun. 30, 2015, and Japanese Patent Application No. 2016-021030 filed with the Japan Patent Office on Feb. 5, 2016, the entire contents of which are incorporated into this specification.

The invention claimed is:

1. A vehicle fluid-heating device for heating fluid comprising:
   a heater unit configured to have a heater and a heating portion, the heating portion being formed so as to cover a surrounding of an outer surface of the heater; and
   a tank configured to accommodate the heater unit,
   wherein the heating portion includes
      an inner heat exchange surface formed on an inner surface of a through hole penetrating through an inner side of the heater, the inner heat exchange surface being configured to perform heat exchange with the fluid, and
      an outer heat exchange surface formed on an outer-wall portion of an outer side of the heater, the outer heat exchange surface being configured to perform heat exchange with the fluid,
   a heat transfer area of the outer-wall portion is larger than a heat transfer area of the through hole,
   the outer-wall portion has outer circumferential fins, the outer circumferential fins being configured to project towards an outer circumference,
   the tank has a top surface, the top surface being configured to close an opening portion for inserting the heater unit,
   the outer circumferential fins are provided so as to extend substantially parallel to the top surface,
   the through hole forms an inner circumferential flow channel, the inner circumferential flow channel being configured such that the fluid flows therethrough,
   the outer-wall portion providing an outer circumferential flow channel, the outer circumferential flow channel being configured such that the fluid flows between the outer-wall portion and an inner wall of the tank,
   the inner circumferential and the outer circumferential flow channels being configured to permit fluid to flow from the inner circumferential flow channel to the outer circumferential flow channel continuously, and
   a flow channel area of the outer circumferential flow channel is larger than a flow channel area of the inner circumferential flow channel.

2. The vehicle fluid-heating device according to claim 1, wherein
   the top surface is connected with the heating portion.

3. The vehicle fluid-heating device according to claim 2, wherein
   the heater unit has
      a connecting portion configured to connect the top surface and the heating portion, and
      a heat releasing portion formed so as to project out from the connecting portion.

4. The vehicle fluid-heating device according to claim 3, wherein the connecting portion is formed such that a sectional area of a first portion connected to the heating portion is smaller than a sectional area of a second portion connected to the top surface.

5. The vehicle fluid-heating device according to claim 2, wherein
both ends of the heater are connected with the top surface via the heating portion.

6. The vehicle fluid-heating device according to claim 2, wherein
the heater has a heat generating part, the heat generating part being formed to have a helical-shape,
the through hole is formed so as to have a diameter smaller than an inner circumference of the heat generating part, the through hole being configured to penetrate through the heat generating part along a center axis thereof, and
the outer-wall portion is formed so as to have a diameter larger than an outer circumference of the heat generating part, the outer-wall portion being configured to face the inner wall of the tank.

7. The vehicle fluid-heating device according to claim 2, wherein
the through hole has inner circumferential fins, the inner circumferential fins being configured to project towards an inner circumference.

8. The vehicle fluid-heating device according to claim 7, wherein
the inner circumferential fins are formed along a flowing direction of the fluid.

9. The vehicle fluid-heating device according to claim 7, wherein the outer circumferential fins are provided closer to the top surface than a central portion of the tank and formed such that a distance from a proximal portion is increased towards the top surface as compared to that at the central portion of the tank.

10. The vehicle fluid-heating device according to claim 7, wherein the outer circumferential fins are provided farther from the top surface than a central portion of the tank and formed such that the distance from a proximal portion is increased with increasing distance from the top surface as compared to that at the central portion of the tank.

11. The vehicle fluid-heating device according to claim 7, wherein
the inner circumferential fins are formed so as to extend towards the inner circumference in a radiating pattern.

12. The vehicle fluid-heating device according to claim 7, wherein
the outer circumferential fins are formed along a flowing direction of the fluid.

13. The vehicle fluid-heating device according to claim 7, wherein
the outer-wall portion of a proximal portion of the outer circumferential fins is adjacent to the heater.

14. The vehicle fluid-heating device according to claim 7, wherein
a number of the outer circumferential fins is greater than a number of the inner circumferential fins.

15. The vehicle fluid-heating device according to claim 7, wherein
a length of the outer circumferential fins is greater than a length of the inner circumferential fins.

16. The vehicle fluid-heating device according to claim 1, wherein the tank has
a supply port configured to supply the fluid, and
a discharge port configured to discharge the fluid, and
the discharge port opens so as to be aligned with the supply port on a same surface of the tank.

17. The vehicle fluid-heating device according to claim 16, wherein
one of the supply port and the discharge port opens on a line extending from the through hole.

18. The vehicle fluid-heating device according to claim 17, wherein
the supply port opens on the line extending from the through hole.

* * * * *